US012612294B2

(12) United States Patent
Sukalski et al.

(10) Patent No.: US 12,612,294 B2
(45) Date of Patent: Apr. 28, 2026

(54) FORKLIFT TRUCK SENSOR SCALE

(71) Applicant: Illinois Tool Works Inc., Glenview, IL (US)

(72) Inventors: Andrew Sukalski, Fairmont, MN (US); Thomas Howard Johnson, Winnebago, MN (US); Kevin Detert, Fairmont, MN (US); Cory Hainy, Fairmont, MN (US); Eric Holland, Lake Crystal, MN (US)

(73) Assignee: Illinois Tool Works Inc.

( * ) Notice: Subject to any disclaimer, the term of this patent is extended or adjusted under 35 U.S.C. 154(b) by 203 days.

(21) Appl. No.: 17/713,360

(22) Filed: Apr. 5, 2022

(65) Prior Publication Data

US 2022/0340404 A1 Oct. 27, 2022

Related U.S. Application Data

(60) Provisional application No. 63/180,288, filed on Apr. 27, 2021.

(51) Int. Cl.

| | |
|---|---|
| ***B66F 9/24*** | (2006.01) |
| ***B66F 9/07*** | (2006.01) |
| ***B66F 9/075*** | (2006.01) |
| ***B66F 17/00*** | (2006.01) |

(52) U.S. Cl.

CPC .......... *B66F 17/003* (2013.01); *B66F 9/0755* (2013.01); *B66F 9/07554* (2013.01); *B66F 9/24* (2013.01)

(58) Field of Classification Search

CPC .. B66F 17/003; B66F 9/0755; B66F 9/07554; B66F 9/24

See application file for complete search history.

(56) References Cited

U.S. PATENT DOCUMENTS

| | | | | |
|---|---|---|---|---|
| 4,828,066 A * | 5/1989 | Hayashi | B62D 5/0463 180/446 |
| 5,410,109 A * | 4/1995 | Tarter | G01G 23/3728 177/136 |
| 6,232,566 B1 | 5/2001 | Bruns | |
| 6,611,746 B1 * | 8/2003 | Nagai | B66F 9/0755 187/222 |
| 7,216,024 B1 * | 5/2007 | Abels | B66F 17/003 37/304 |

(Continued)

FOREIGN PATENT DOCUMENTS

| | | |
|---|---|---|
| EP | 2276689 | 1/2011 |
| EP | 3072846 | 9/2016 |
| JP | S4991027 | 8/1974 |

OTHER PUBLICATIONS

Int'l Search Report and Written Opinion Appln No. PCT/US2022/023655 mailed Sep. 12, 2022.

*Primary Examiner* — Tyler J Lee

(74) *Attorney, Agent, or Firm* — MCANDREWS HELD & MALLOY, LTD.

(57) ABSTRACT

The present disclosure provides a lift truck weighing system that includes a plurality of sensors configured to measure forces acting on a lift truck. In particular, the sensors are secured at one or more interfaces between a plurality of axles and a chassis of the lift truck. In some examples, the sensors are secured to and/or incorporated with a plurality of axles configured to support the lift truck wheels, such as to or within the axles.

12 Claims, 4 Drawing Sheets

(56) References Cited

U.S. PATENT DOCUMENTS

| | | | | |
|---|---|---|---|---|
| 7,992,686 | B2 * | 8/2011 | McCabe | G06Q 10/08 701/50 |
| 10,425,128 | B2 * | 9/2019 | Kirk | G07C 5/008 |
| 10,507,826 | B2 * | 12/2019 | Giorgio Bort | B60W 50/14 |
| 2001/0008985 | A1 * | 7/2001 | Wada | G05D 1/0272 701/1 |
| 2007/0198157 | A1 | 8/2007 | Righi | |
| 2011/0234242 | A1 * | 9/2011 | Gerster | B66F 17/003 324/654 |
| 2012/0292871 | A1 * | 11/2012 | Wittmann | B60G 21/0551 280/124.106 |
| 2019/0241030 | A1 * | 8/2019 | Cyllik | B60C 23/0416 |
| 2020/0309641 | A1 * | 10/2020 | Balboni | G06F 30/15 |
| 2021/0148084 | A1 * | 5/2021 | Ashby | G05D 1/0278 |
| 2021/0214205 | A1 * | 7/2021 | Strong | B66F 9/24 |

* cited by examiner

FORKLIFT TRUCK SENSOR SCALE

RELATED APPLICATIONS

The present application claims the benefit of, and priority to, U.S. Provisional Application No. 63/180,288, filed Apr. 27, 2021, entitled "Forklift Truck Sensor Scale." The complete subject matter and contents of U.S. Provisional Application No. 63/180,288 is incorporated herein by reference in its entirety.

BACKGROUND

Some lift trucks can include a scale to measure a load of carried by the lift truck, such as via a lift truck scale. For example, attachments to lift trucks can be added to a standard carriage that normally carries the lifting forks. However, issues exist with weighing systems including the use of attachments, such as reduced lift capacity of the lift truck, complicating removal and/or repair of the lift truck and/or lift truck scale.

Accordingly, there is a need for a lift truck weighing system that provides a robust and simple sensor arrangement and sensor systems.

SUMMARY

Disclosed is a lift truck weighing system that includes a plurality of sensors configured to measure forces acting on a lift truck. In particular, the sensors are secured at one or more interfaces between a plurality of axles and a chassis of the lift truck. In some examples, the sensors are secured to and/or incorporated with a plurality of axles configured to support the lift truck wheels, such as to or within the axles.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1A:
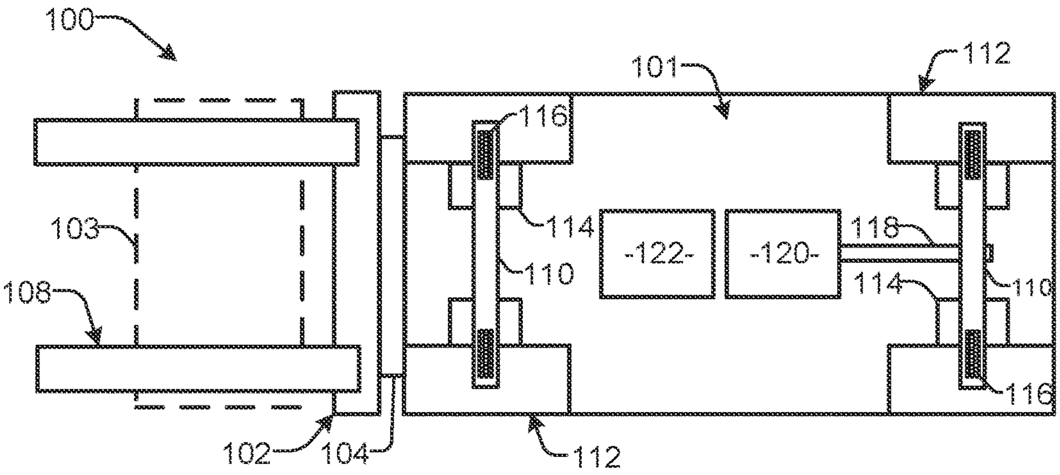
FIG. 1A is a diagrammatic illustration of an example lift truck weighing system, in accordance with aspects of this disclosure.

The present disclosure describes a lift truck weighing system that includes a plurality of sensors to measure forces acting on a lift truck. For example, a plurality of sensor mounts are employed to secure the sensors within a plurality of axles supporting wheels from a chassis of the lift truck.

In some examples, a lift truck weighing system includes a plurality of sensors configured to measure forces acting on a lift truck, with a plurality of sensor mounts employed to secure the sensors at one or more interfaces between a plurality of axles and a chassis of the lift truck.

In some examples, a lift truck weighing device includes a first sensor arranged between a tilt bracket of a lift truck mast, and/or a second sensor arranged between a mast support of the lift truck mast. Control circuitry can be employed to receive force measurements from the first and second sensors; calculate a change in force at the tilt bracket or the mast support; and determine a weight of a load on the lift truck based on the calculated changes.

In some examples, a lift truck weighing device includes one or more sensors arranged between a mounting interface for a lift truck carriage and a support bracket for a lift truck mast, the one or more sensors configured to measure a load from one or more load handling fixtures mounted to the lift truck carriage.

The disclosed lift truck attachment system provides advantages over conventional lift truck designs by arranging sensors at interfaces of structural features of the lift truck. Accordingly, the disclosed examples provide a lift truck weighing system provides a versatile system, with increased lift capacity and reduced cost for advanced lift truck attachments. The arrangement of sensors can be modified, as well as provision of measurements to a computing platform, to capture load data for processing, such as compensation and filtering, to improve measurement accuracy.

In disclosed examples, a lift truck weighing system includes a plurality of sensors configured to measure forces acting on a lift truck; and a plurality of sensor mounts configured to secure the sensors within a plurality of axles that are configured to support wheels from a chassis of the lift truck.

In some examples, the plurality of axles includes one or more drive axles, the one or more of the plurality of sensors secured within the one or more drive axles.

In some examples, the one or more drive axles are configured to steer the lift truck via the drive axle.

In some examples, one or more secondary sensors are arranged at one or more of a lift truck carriage, a lift truck carriage attachment, or a load handling fixture.

In some examples, a control circuitry is configured to receive force measurements from the plurality of sensors; calculate a change in force at one or more axles of the plurality of axles; and determine a weight distribution on the lift truck based on the calculated change. In examples, the control circuitry is further configured to determine a load on the lift truck based on the calculated change in force. In examples, the control circuitry is further configured to compare the weight distribution to one or more threshold weight distribution plans; and determine whether the weight distribution exceeds a threshold weight distribution plan.

In some examples, the control circuitry is further configured to transmit a signal to one or more systems to adjust one or more operating parameters to modify the weight distribution in response to a determination that the weight distribution exceeds the threshold weight distribution plan. In examples, the one or more systems include a counterbalancing system. In examples, the control circuitry is further configured to transmit an alert signal to an operator with the weight distribution determination. In examples, the one or more threshold weight distribution plans defines a desired weight distribution on four wheels of the fork lift.

In some examples, the plurality of sensors includes one or more of a strain gauge to measure changes in force, an inertial movement unit to measure changes in acceleration, or a spindle sensor to measure one or more of vibration, direction of spindle movement, position of the spindle sensor.

In some disclosed examples, a lift truck weighing system includes a plurality of sensors configured to measure forces acting on a lift truck; and a plurality of sensor mounts configured to secure the sensors at one or more interfaces between a plurality of axles and a chassis of the lift truck.

In some examples, a control circuitry is configured to receive force measurements from the plurality of sensors; calculate a change in force at one or more axles of the plurality of axles; and determine a weight distribution on the lift truck based on the calculated change.

In some examples, the plurality of sensor mounts are integrated within the chassis. In examples, the plurality of sensor mounts are integrated in a suspension supporting a wheel of the lift truck.

In some disclosed examples, a lift truck weighing system including one or more sensors arranged along a length or a width of a chassis of a lift truck, the one or more sensors configured to measure changes of one or more of a force at the sensors or a position of the sensors in response to a load on the lift truck.

In some examples, the one or more sensors includes a strain gauge. In some examples, the change in position corresponds to an absolute change or a relative change in position of the one or more sensors. In some examples, the change in position corresponds to an absolute change or a relative change in position between two sensors of the one or more sensors.

In some examples, a control circuitry is configured to receive data corresponding to the measured changes from the one or more sensors; and calculate a load on the lift truck based on the change.

In some examples, the one or more sensors are mounted directly to the chassis. In examples, the one or more sensors are attached to or incorporated with a deformable rod attached to the chassis. In examples, the one or more sensors are configured to sense an amount of deformation in the rod and transmit signals corresponding to the amount of deformation to the control circuitry.

In some examples, the one or more sensors are configured to sense an amount of deformation in the chassis and transmit signals corresponding to the amount of deformation to the control circuitry.

In some disclosed examples, a lift truck weighing device includes a first sensor arranged between a tilt bracket of a lift truck mast; a second sensor arranged between a mast support of the lift truck mast; and control circuitry configured to receive force measurements from the first and second sensors; calculate a change in force at the tilt bracket or the mast support; and determine a weight of a load on the lift truck based on the calculated changes.

In some examples, the first and second sensors includes an accelerometer to measure acceleration changes as a position or orientation of the tilt bracket or mast support changes. In examples, the control circuitry is further configured to receive acceleration change measurements from to the first and second sensors; and calculate a force vector at the first and second sensors based on the received acceleration change measurements.

In some examples, the control circuitry is further configured to determine a weight distribution on the lift truck based on acceleration change measurements; compare the weight distribution to one or more threshold weight distribution plans; and determine whether the weight distribution exceeds a threshold weight distribution plan.

In some examples, the control circuitry is further configured to transmit a signal to one or more systems to adjust one or more operating parameters to modify the weight distribution in response to a determination that the weight distribution exceeds the threshold weight distribution plan.

In some disclosed examples, a lift truck weighing device includes one or more sensors arranged between a mounting interface for a lift truck carriage and a support bracket for a lift truck mast, the one or more sensors configured to measure a load from one or more load handling fixtures mounted to the lift truck carriage.

In some examples, the one or more sensors are integrated into the support bracket.

When introducing elements of various embodiments described below, the articles “a,” “an,” and “the” are intended to mean that there are one or more of the elements. The terms “comprising,” “including,” and “having” are intended to be inclusive and mean that there may be additional elements other than the listed elements. Moreover, while the term “exemplary” may be used herein in connection to certain examples of aspects or embodiments of the presently disclosed subject matter, it will be appreciated that these examples are illustrative in nature and that the term “exemplary” is not used herein to denote any preference or requirement with respect to a disclosed aspect or embodiment. Additionally, it should be understood that references to “one embodiment,” “an embodiment,” “some embodiments,” and the like are not intended to be interpreted as excluding the existence of additional embodiments that also incorporate the disclosed features.

As used herein, the terms “coupled,” “coupled to,” and “coupled with,” each mean a structural and/or electrical connection, whether attached, affixed, connected, joined, fastened, linked, and/or otherwise secured. As used herein, the term “attach” means to affix, couple, connect, join, fasten, link, and/or otherwise secure. As used herein, the term “connect” means to attach, affix, couple, join, fasten, link, and/or otherwise secure.

As used herein, the terms “first” and “second” may be used to enumerate different components or elements of the same type, and do not necessarily imply any particular order.

As used herein the terms “circuits” and “circuitry” refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second “circuit” when executing a second one or more lines of code. As utilized herein, circuitry is “operable” and/or “configured” to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

Figure 1B:
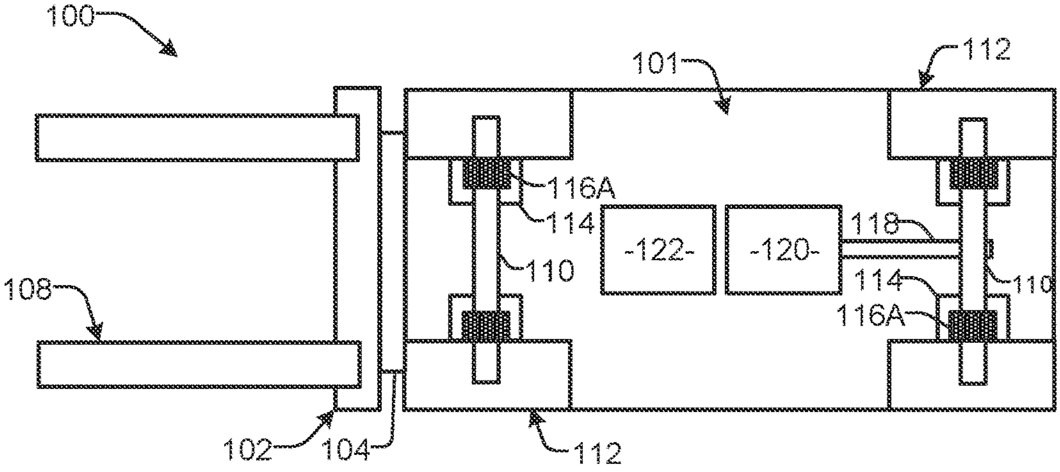
FIG. 1B is a diagrammatic illustration of another example lift truck weighing system, in accordance with aspects of this disclosure.
Figure 1C:
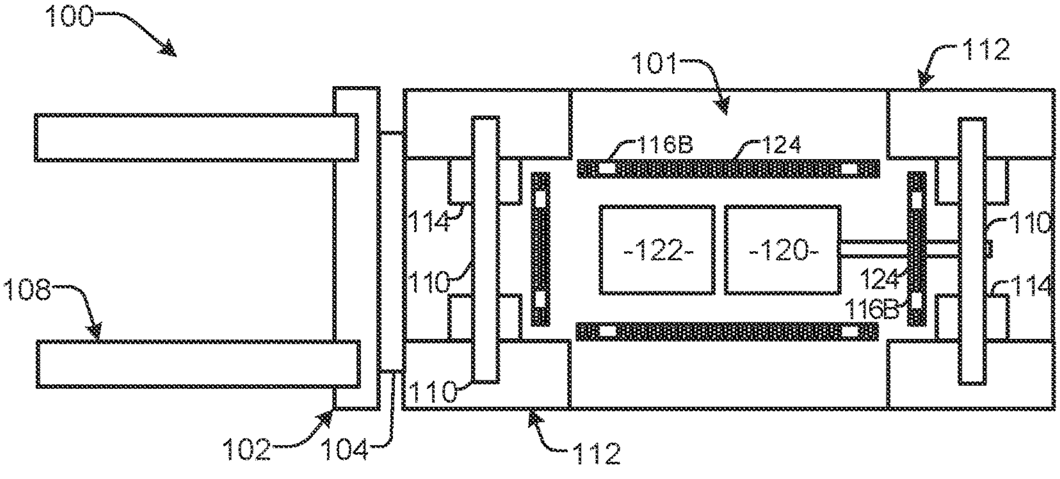
FIG. 1C is a diagrammatic illustration of yet another example lift truck weighing system, in accordance with aspects of this disclosure.

Turning now to the drawings, FIGS. 1A to 1C illustrate a partial underbody (e.g., bottom) view of example lift truck weighing systems 100, in accordance with aspects of this disclosure. In the example of FIG. 1A, the system 100 includes a chassis or frame 101, which is connected to a lift truck mount 104 configured to move via a mechanical lift in response to a user command which may have masts included. As disclosed herein, a lift truck carriage 102 is mounted to, or part of, the lift truck mount 104, and configured to support one or more forks or load handling fixtures 108 to support and/or manipulate a load 103. Thus, an operator can command the lift truck attachment system 100 to raise and/or lower to manipulate a load.

As shown, one or more wheels 112 are arranged to support and/or drive the system 100 during operation. One or more axles 110 extend into and/or are secured to the wheels 112, one or more of the axles 110 being mounted to and/or interface with the chassis 101 via one or more support mounts 114 (e.g., a strut, mechanical suspension, hydraulic support, etc.). The system 100 and/or a motor 120 may be controlled by an operator and/or control system 164 to drive, steer, and/or otherwise control the one or more wheels 112, such as via a clutch 118 and/or other mechanical or electronic control. In some examples, a control circuitry or system 122 is included, which may contain a processor 150, memory storage device 156, one or more interfaces 154, a communications transceiver 152, an energy storage device 160, and/or other circuitry (e.g., control system 164) to control the system 100 (see, e.g., FIG. 5). In some examples, the system 100 is powered by one or more of batteries, an engine, solar or hydrogen cell, and/or mains power, as a non-limiting list of examples.

In the example of FIG. 1A, one or more sensors 116 are configured to measure forces acting on the lift truck system 100. For example, the one or more sensors 116 are arranged at or near one or more interfaces between the one or more wheels 112 and the chassis 101 of the lift truck. In some examples, the sensors 116 are secured to and/or incorporated with the one or more axles 110 and the chassis 101 of the lift truck, for instance, to measure forces on the lift truck from supporting a load 103. The sensors 116 can include one or more of a strain gauge to measure changes in force, an inertial movement unit to measure changes in acceleration, or a spindle sensor to measure one or more of vibration, direction of spindle movement, and position of the spindle sensor.

In some examples, the axles 110 include one or more drive axles, such that one or more sensors 116 are secured at and/or within the drive axle(s). For instance, the one or more drive axles are configured to steer the lift truck via the drive axle.

As shown in FIG. 1A, the loading fixtures 108 (and/or any attachments) are configured to mount onto the lift truck carriage 102, which generates a generally vertical force downward at the lift truck mount 104. The downward force changes the weight distribution of the system 100, generally focusing additional forces at the wheels 112 in closer proximity to the load 103 (e.g., the front of the system 100).

As the weight on the loading fixture 108 exerts a force on the system 100, the forces transferred through each wheel 112 may differ, such that the proportion of the weight supported by the each wheel is sensed by a respective sensor 116. The amount of force (and/or location of the respective wheel, change in force at that location), as well as any secondary data (e.g., speed of the system 100, acceleration data, angular changes, etc.), are transmitted (via wired and/or wireless communications) to the control circuitry 122 for analysis.

The control circuitry 122 may be configured to receive measurements (e.g., force measurements) from the sensors 116, such as by a digital and/or analog data signal. The control circuitry 122 is configured to calculate a change in the force acting on the system 100 at one or more axles 110 in order to determine a weight of the load 103 and/or a weight distribution on the lift truck from the load 103 based on the calculated change. Such calculations may be static (e.g., while the system 100 is stopped, having secured a load 103), and/or dynamic (e.g., while the system 100 is in motion, as the load 103 changes, etc.), and may be calculated during a calibration process and/or at an ongoing basis while the system 100 is in operation.

Based on the calculated changes, the control circuitry 122 is also configured to compare the weight distribution to one or more threshold weight distribution plans to gauge stability of the system 100. For example, the control circuitry 122 determines whether the weight distribution exceeds a threshold weight distribution plan, which may correspond to the weight distribution of the system 100 and/or a determined weight at a specific axle of the plurality of axles 110. In some examples, the one or more threshold weight distribution plans defines a desired weight distribution on four wheels 112 of the system 100 (e.g., as measured by a respective sensor 116). In some examples, threshold values and/or distribution plan data 158 are stored in the memory storage device 156, accessible to the processor 150 for analysis.

In some examples, the control circuitry 122 is further configured to control one or more associated systems to mitigate any issues stemming from violating a weight distribution threshold (e.g., resulting in an unstable load 103 and/or system 100). If a threshold weight distribution plan or value is exceeded, the control circuitry 122 is operable to transmit a signal (e.g., via one or more transceivers and/or interfaces) to one or more systems (e.g., a counterbalancing system) to adjust one or more operating parameters to modify the weight distribution in response to a determination that the weight distribution exceeds the threshold weight distribution plan or value. The signal may include an alert signal transmitted to an operator facing device (e.g., a user interface, a remote computer or controller, etc.) which provides an indication of the weight distribution determination.

Although illustrated as having sensors 116 arranged within and/or about the axles 110, in some examples one or more secondary sensors may be arranged at one or more of the lift truck carriage 102, the lift truck carriage attachment 104, and/or the load handling fixtures 108, as well as other suitable locations. Such secondary sensors may be employed to validate measurements from the sensors 116, provide additional data (e.g., acceleration, orientation, temperature, location, strain, etc.), further enhancing data collection and analysis capabilities of the system 100.

Although some examples are represented as fork lift trucks, the concepts disclosed herein are generally applicable to a variety of vehicles (e.g., lorries, carts, etc.) and/or lift modalities (e.g., "walkie stackers," pallet jacks, etc.) to determine weight of a load, and/or weight distribution on the system.

In some examples, the sensors 116 employ one or more load cells configured to measure a shear force transmitted through from the wheels 112 (which make contact with a ground surface supporting the weight of the system) through the axles 110 and the chassis 101 (which constitutes the massive parts of the system and/or load). Devices and/or components (not shown) may be connected to provide signals corresponding to the output from the sensors(s) 116 for analysis, display, and/or recordation, for instance.

Figure 5:
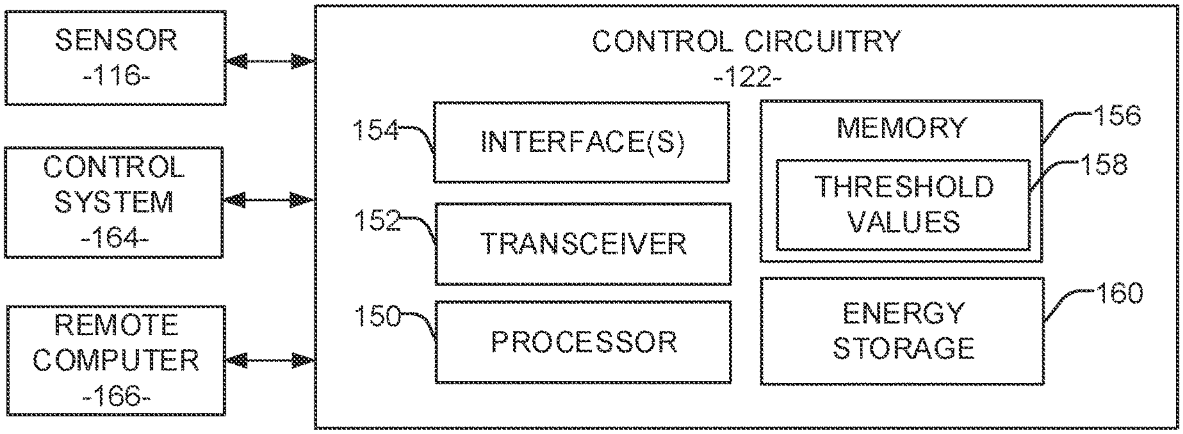
FIG. 5 is a diagrammatic illustration of an example control circuitry, in accordance with aspects of this disclosure.

For example, information regarding the sensed load is provided to the control circuitry 122 and/or another computing platform (e.g., remote computer or system 166) for analysis, display, recordation, etc. As shown in the example of FIG. 5, a processor 150 can be configured to receive and translate information from the one or more sensors 116 (e.g., load cells) into a digital format, for display to an operator (e.g., via an interface 154), to store in memory (e.g., memory storage device 156), and/or transmission to another computing platform 166, such as a remote computer and/or central repository. In some examples, the sensors 116 may include a wired and/or wireless transceiver to transmit information to another device for processing. The processor 150 that receives the output is capable of resolving and measuring reactive forces acting on force sensor(s) 116. The control circuitry 122 and/or the processor 150 is capable of executing computer readable instructions, and may be a general-purpose computer, a laptop computer, a tablet computer, a mobile device, a server, and/or any other type of computing device integrated or remote to the system 100. In some examples, the control circuitry 122 is implemented in a cloud computing environment, on one or more physical machines, and/or on one or more virtual machines.

In examples, the sensor 116 is a strain gauge, but can be additionally or alternatively a piezoelectric crystal, a displacement transducer, accelerometers, inclinometers and/or tilt sensors, vibrating beam sensors, fiber optic sensors, or some other type of sensor that provides desired sensitivity and accuracy. In examples, one or more sensors 116 may include an impedance or resonator, such as a quartz crystal. Such sensors 116 are excited by DC, pulsed or switched polarity. Strain gauge load cells operate under principles where deformation provides a voltage output proportional to the deformation based on the material characteristics.

For example, the sensor(s) 116 are configured to generate a signal representative of the force applied during a measuring operation and transmit that signal to a device configured to receive and analyze the signal. The electrical signal output is then measured by the device and the amplitude of the load calculated as a result, where this force is translated into a signal that is sent to a circuit for evaluation.

For example, the force sensor(s) 116 may be in communication with the processor 150 and/or other device to generate an output associated with a measured value (e.g., for display, to provide an audible alert, for transmission to a remote computing platform, for storage in a medium, etc.). The processor is configured to parse analog or digital signals from the one or more sensors in order to generate the signal. Generally, any number or variety of processing tools may be used, including hard electrical wiring, electrical circuitry, transistor circuitry, including semiconductors and the like.

In some examples, the memory storage device 156 may consist of one or more types of permanent and temporary data storage, such as for providing the analysis on force sensor data and/or for system calibration. The memory 156 can be configured to store calibration parameters for a variety of parameters, such as load cell type, force sensor type, etc. The historical measurement data can correspond to, for example, operational parameters, sensor data, a user input, as well as data related to trend analysis, threshold values, profiles associated with a particular measurement process, etc., and can be stored in a comparison chart, list, library, etc., accessible to the processor 150. The output from the processor 150 can be displayed graphically, such as the current load measurement, a historical comparison, for instance. This process can be implemented to calibrate the weight of the system 100 and/or the weight distribution (e.g., prior to loading).

Although the example system 100 is provided with each of four wheels 112 having a respective sensor 116, any number of sensors may be employed, such as a five or more sensors, three or fewer sensors, such as a single sensor.

Further, in some examples the sensors operate in concert (e.g., the respective sensors are employed simultaneously), such that measurements from each sensor or complementary sensors (e.g., from sensors on each axle, from horizontally aligned sensors, and/or any combination of sensors), may be provided to the processor 150 to calculate an accurate load weight and/or a component of the load. In addition to or in the alternative, various other parameters or features may be measured, calculated, or otherwise determined via the sensors, such as, for example, strain, end force, side force, vertical force, acceleration, angle, roll and pitch, direction of travel, torque, thrust, as a list of non-limiting examples. In some examples, a single sensor may be employed to weigh the load, and/or one or more sensors may provide a measurement at varying times and/or based on one or more triggers (e.g., a change in position, location, angle, height, etc.).

Turning now to FIG. 1B, as shown the system 100 employs sensors 116A arranged at one or more interfaces between the axles 110 and the chassis 101 of the lift truck system. One or more support mounts 114 may secure one or more of the axle 110 and/or the sensors 116A to the chassis 101. For example, the sensors 116A may be configured to support the axles 110 and/or the wheels 112, such that any force applied to the system 100 will translate through the sensors 116A to the wheel 112.

In some examples, the sensors 116A are incorporated with the sensor mounts 114, which are integrated within the chassis 101 at the interface between the axle and the chassis. In some examples, the sensors 116A are and/or are incorporated into a suspension supporting a wheel 112 of the lift truck system 100.

FIG. 1C illustrates another lift truck weighing system 100 employing one or more sensors 116B arranged along and/or integrated with the chassis 101. In the example of FIG. 1C, the sensors 116B are arranged along a length or a width of the chassis 101, the sensors 116B being configured to measure changes in a force measurement and/or displacement of the sensor 116B, or displacement relative to another sensor 116B or other point of reference.

For example, the change in position (e.g., absolute and/or relative position) of the sensor(s) 116B are indicative of an applied force. The control circuitry 122 is configured to receive data from each sensor 116B, correlate changes from each sensor 116B (e.g., based on sensor location and/or calibration information) to determine a weight of the load and/or load distribution based on the indirect load measurement data.

In some examples, one or more of the sensors 116B are attached to and/or otherwise incorporated with a deformable rod 124, which is itself attached to the chassis 101. For instance, the sensors 116B may sense an amount of deformation in the rod 124 caused in response to the application of force from a load 103. The sensors 116B can then transmit signals corresponding to the amount of deformation to the control circuitry 122.

Figure 2:
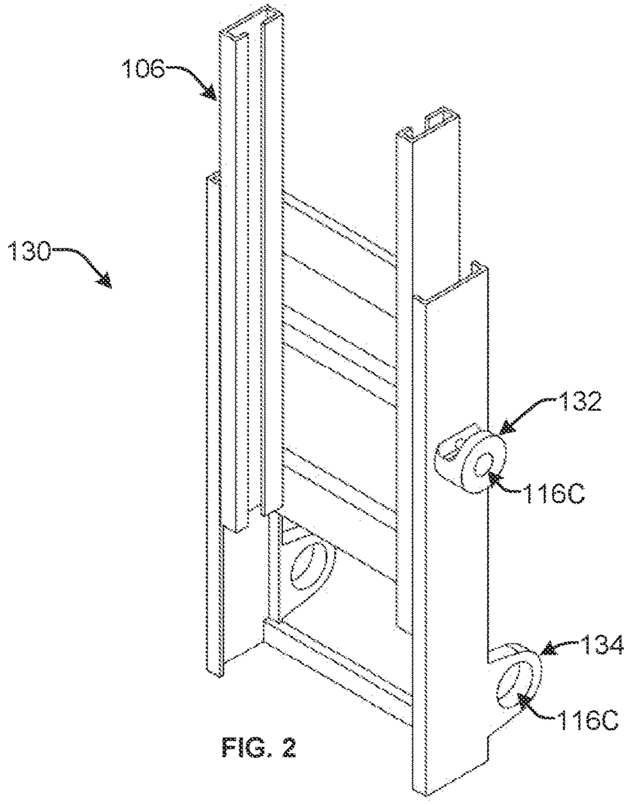
FIG. 2 illustrates a perspective view of an example lift truck weighing system, in accordance with aspects of this disclosure.

FIG. 2 illustrates a perspective view of an example lift truck weighing device 130 that employs one or more sensors 116C arranged at an interface between a lift truck mast 106 and the lift truck system 100. In some examples, a sensor 116C is arranged between a tilt bracket 132 of a lift truck mast 106. In some additional or alternative examples, a sensor 116C is arranged between a mast support 134 of the lift truck mast 106 and the lift truck system 100.

The sensors 116C are configured to measure a force on the loading fixtures 108 via the mast 106. In some examples, the mast 106 is configured to move, such as tilt or rotate about an axis at the mast support 134, which will reposition the location of the load 103 relative to the system 100. The change in location will result in a changing force experienced at various sensor locations, which can be measured and transmitted to the control circuitry 122. The control circuitry 122 is then configured to calculate a change in force at the tilt bracket or the mast support; and then make a determination of the weight of a load on the lift truck based on the calculated changes.

In some examples, the sensors 116C include an accelerometer to measure acceleration changes as a position or orientation of the tilt bracket or mast support changes. Based on the acceleration data, the control circuitry 122 can calculate a force vector at the sensor locations based on the received acceleration change measurements.

Figure 3A:
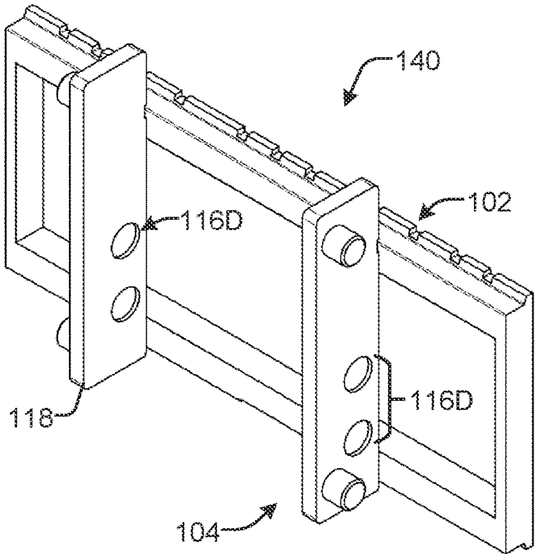
FIGS. 3A and 3B illustrate several perspective views of an example lift truck weighing system employing sensors at an interface between a lift truck carriage and a lift truck mount, in accordance with aspects of this disclosure.
Figure 3B:
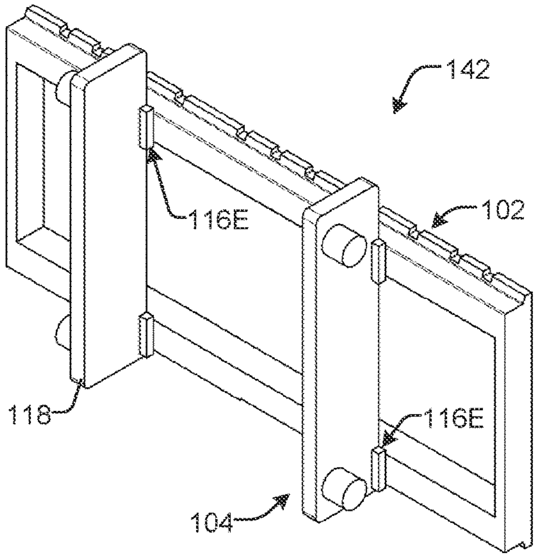

FIGS. 3A and 3B provide several perspective views of an example lift truck weighing system employing sensors 116 at an interface between a lift truck carriage 102 and a lift truck mount 104, in accordance with aspects of this disclosure.

As shown in the example of FIG. 3A, a lift truck weighing device 140 incorporates one or more sensors 116D integrated into one or more support brackets 118 of the lift truck mount 104, the sensors 116D being configured to measure a load from load handling fixtures mounted to the lift truck carriage 102.

As shown in the example of FIG. 3B, a lift truck weighing device 140 incorporates one or more sensors 116E arranged between a mounting interface for the lift truck mount 104 and the support bracket 118, the sensors 116E being configured to measure a load from load handling fixtures mounted to the lift truck carriage 102.

As disclosed herein, the lift truck carriage 102 may receive fixturing, which supports a load. Forces from the weight of the load travel through the lift truck carriage 102, then through the sensors 116D, 116E, and into the lift truck mount 104. As the forces traverse the supports 118 and/or the interface between the lift truck carriage 102 and the lift truck mount 104, the sensors 116D, 116E arranged therein measure the forces, such measurements can then be provided to another device (e.g., the control circuitry 122) for processing, in accordance with aspects of this disclosure.

Figure 4:
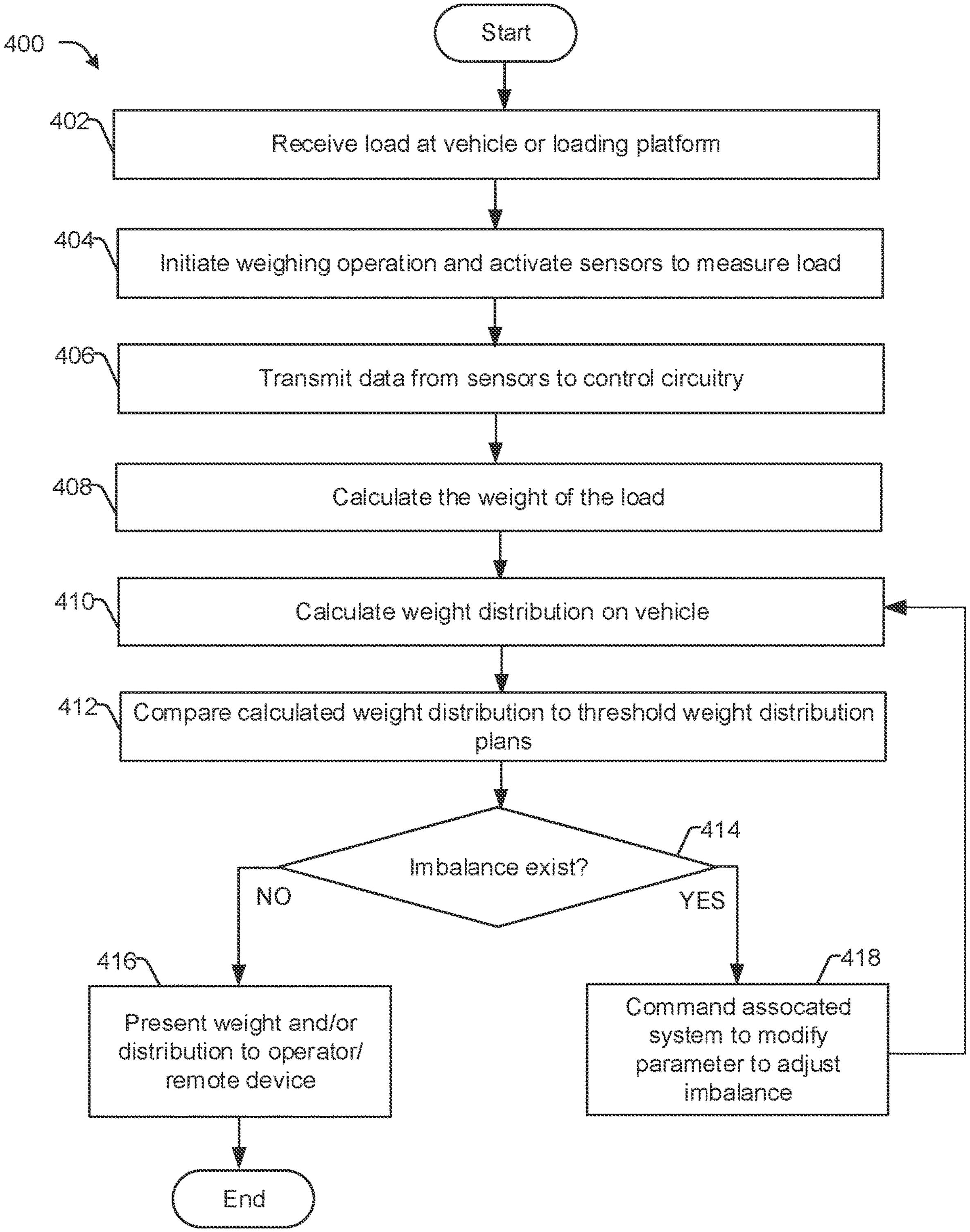
FIG. 4 illustrates an example flow chart of implementing a lift truck weighing system, in accordance with aspects of this disclosure.

FIG. 4 is a flowchart representative of the program 400. For example, the program 400 may be stored on a memory (e.g., memory circuitry 156) linked to processor (e.g., processor 150) as a set of instructions to implement weighing operation via associated circuitry (e.g., control circuitry 122), as disclosed herein.

At block 402, a load or object is provided on a vehicle or other loading structure and, in response, the program 400 activates a one or more sensors, which may include one or more sensors arranged within or about an axle, within or secured to a chassis, and/or at an interface between two structural elements of the support and/or lifting apparatus. At block 404, the system initiates a weighing operation, such as in response to a user input (e.g., a command to initiate the operation), a sensor input (e.g., a motion and/or weight sensor), etc.

At block 406, the sensor data is transmitted from the sensors and received at the control circuity. For example, each sensor may transmit force data (associated with application of the load), as well as location on the vehicle (e.g., location of the specific axle or interface) and/or orientation, angle, or position of the sensor and/or a change thereof. At block 408, the system calculates the weight of the load based on the received sensor data. For example, one or more filters and/or mathematical factors may be applied to the received data to accommodate weight measurements taken at varying locations throughout the system (e.g., at various axles, arranged on the chassis, at the one or more interfaces, etc.).

At block 410, the system calculates the weight distribution (e.g., distribution of forces on the vehicle platform) experienced by the vehicle in response to application of the load. At block 412, the calculated weight distribution is compared to one or more threshold weight distribution plans 158 (e.g., stored in memory 156) corresponding to a desired weight distribution for the particular vehicle, weight of the applied load, environment, etc.

At block 414, the system determines whether an imbalance exists based on the comparison. If no imbalance exists, the calculated weight of the load is presented to the operator and/or transmitted to another device (e.g., remote computer 166) for additional processing in block 416. If an imbalance does exist, the system can command one or more associated systems to modify one or more parameters to adjust a weight balance on the vehicle 418. Once modifications are performed, the program 400 may return to block 410 to re-calculate the weight distribution and determine if the imbalance remains. The process may be repeated until no imbalance is found. If the imbalance cannot be addressed by automatic adjustments, a further alert may be presented to the operator and/or another device for additional actions.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A lift truck weighing system for a lift truck including a plurality of axles and a chassis, comprising:
- a plurality of sensors configured to measure forces acting on the lift truck;
- a plurality of sensor mounts arranged between the plurality of axles and the chassis, the plurality of sensor mounts configured to secure the plurality of sensors and the plurality of axles to the chassis of the lift truck; and
- control circuitry configured to:
  - receive force measurements from the plurality of sensors;
  - calculate a change in force at one or more axles of the plurality of axles;
  - determine a weight distribution on the lift truck based on the calculated change;
  - compare the weight distribution to one or more threshold weight distribution plans; and
  - determine whether the weight distribution exceeds a threshold weight distribution plan.

2. The lift truck weighing system of claim 1, further comprising one or more secondary sensors arranged at one or more of a lift truck carriage, a lift truck carriage attachment, or a load handling fixture.

3. The lift truck weighing system of claim 1, wherein the control circuitry is further configured to determine a load on the lift truck based on the calculated change in force.

4. The lift truck weighing system of claim 1, wherein the control circuitry is further configured to transmit a signal to one or more systems to adjust one or more operating parameters to modify the weight distribution in response to a determination that the weight distribution exceeds the threshold weight distribution plan.

5. The lift truck weighing system of claim 4, wherein the one or more systems include a counterbalancing system.

6. The lift truck weighing system of claim 1, wherein the control circuitry is further configured to transmit an alert signal to an operator with the weight distribution determination.

7. The lift truck weighing system of claim 1, wherein the one or more threshold weight distribution plans defines a desired weight distribution on four wheels of the fork lift.

8. The lift truck weighing system of claim 1, wherein the plurality of sensors comprises one or more of a strain gauge to measure changes in force, an inertial movement unit to measure changes in acceleration, or a spindle sensor to measure one or more of vibration, direction of spindle movement, position of the spindle sensor.

9. A lift truck weighing system comprising:
- a plurality of sensors configured to measure forces acting on a lift truck; and
- a plurality of sensor mounts configured to secure the sensors at one or more interfaces between a plurality of axles and a chassis of the lift truck,
- wherein the plurality of sensor mounts are arranged between the plurality of axles and the chassis, the plurality of sensor mounts configured to secure the plurality of sensors and the plurality of axles to the chassis; and
- control circuitry configured to:
  - calculate a change in force at one or more axles of the plurality of axles;
  - determine a weight distribution on the lift truck based on the calculated change; and
  - transmit a signal to one or more systems to adjust one or more operating parameters to modify the weight distribution in response to a determination that the weight distribution exceeds the threshold weight distribution plan.

10. The lift truck weighing system of claim 9, wherein the control circuitry is further configured to:
- receive force measurements from the plurality of sensors;
- calculate a change in force at one or more axles of the plurality of axles; and
- determine a weight distribution on the lift truck based on the calculated change.

11. The lift truck weighing system of claim 9, wherein the plurality of sensor mounts are integrated within the chassis.

12. The lift truck weighing system of claim 9, wherein the plurality of sensor mounts are integrated in a suspension supporting a wheel of the lift truck.

* * * * *